United States Patent
Mann et al.

(10) Patent No.: US 10,482,688 B2
(45) Date of Patent: Nov. 19, 2019

(54) SYSTEM AND METHOD FOR DRIVER RISK ASSESSMENT THROUGH CONTINUOUS PERFORMANCE MONITORING

(71) Applicant: Acculitx, Inc., San Diego, CA (US)

(72) Inventors: Alan Mann, San Diego, CA (US); Peter Ellegaard, San Diego, CA (US)

(73) Assignee: Acculitx, Inc., San Diego, CA (US)

( * ) Notice: Subject to any disclaimer, the term of this patent is extended or adjusted under 35 U.S.C. 154(b) by 243 days.

(21) Appl. No.: 15/455,058

(22) Filed: Mar. 9, 2017

(65) Prior Publication Data

US 2017/0263061 A1 Sep. 14, 2017

Related U.S. Application Data

(60) Provisional application No. 62/305,961, filed on Mar. 9, 2016.

(51) Int. Cl.
  *G07C 5/08* (2006.01)
  *G06Q 40/08* (2012.01)
  *G06Q 10/06* (2012.01)

(52) U.S. Cl.
  CPC ....... *G07C 5/0808* (2013.01); *G06Q 10/0635* (2013.01); *G06Q 40/08* (2013.01)

(58) Field of Classification Search
  None
  See application file for complete search history.

(56) References Cited

U.S. PATENT DOCUMENTS

| 2010/0191411 A1* | 7/2010 | Cook | G07C 5/085 701/31.4 |
| 2015/0193885 A1* | 7/2015 | Akiva | G06Q 40/08 705/4 |
| 2017/0206717 A1* | 7/2017 | Kuhnapfel | H04L 67/22 |

* cited by examiner

*Primary Examiner* — Thomas G Black
*Assistant Examiner* — Ana D Thomas
(74) *Attorney, Agent, or Firm* — Steins & Associates, P.C.

(57) ABSTRACT

A System and Method for Driver Risk Assessment through Continuous Performance Monitoring. The system and method analyzes the full sensor data stream emanating from a vehicle when being driven. The system and method is configurable to rely upon either onboard sensors or the user's smartphone to alert the data capture systems that a driving trip has started or stopped. The system relies on the data contained within the stream to generate the driver's score, rather than upon events resulting from the sensors exceeding a threshold value. The method takes the flow of data and generate scores for sub-sets of the data stream of a standard length so that each user's driving performance can be compared to other drivers being monitored by the method and system.

20 Claims, 6 Drawing Sheets

| DRIVER TENDENCIES FOR ALL TRIPS IN REPORTING PERIOD | | | |
|---|---|---|---|
| SCORE | ACCELERATION | BRAKING | TURNS |
| | S(TA) | S(TB) | S(TT) |
| $W_{AGGRESSIVENESS}$ | W(TAA) | W(TAB) | W(TAT) |
| $W_{DISTRACTION}$ | W(TDA) | W(TDB) | W(TDT) |

FIG. 5

DRIVER EVENTS PER MILE FOR ALL TRIPS IN REPORTING PERIOD

| | ACCELERATION | | BRAKING | | TURNS | | SPEED | |
|---|---|---|---|---|---|---|---|---|
| | SEVERITY(2) | SEVERITY(1) | SEVERITY(2) | SEVERITY(1) | SEVERITY(2) | SEVERITY(1) | SEVERITY(2) | SEVERITY(1) |
| SCORE | S(VA2) | S(VA1) | S(VB2) | S(VB1) | S(VT2) | S(VT1) | S(VS2) | S(VS1) |
| $W_{AGGRESSIVENESS}$ | W(VAA2) | W(VAA1) | W(VAB2) | W(VAB1) | W(VAT2) | W(VAT1) | W(VST2) | W(VST1) |
| $W_{DISTRACTION}$ | W(VDA2) | W(VDA1) | W(VDB2) | W(VDB1) | W(VDT2) | W(VDT1) | W(VST2) | W(VST1) |

SYSTEM AND METHOD FOR DRIVER RISK ASSESSMENT THROUGH CONTINUOUS PERFORMANCE MONITORING

This application is filed within one year of, and claims priority to Provisional Application Ser. No. 62/305,961, filed Mar. 9, 2016.

BACKGROUND OF THE INVENTION

1. Field of the Invention

This invention relates generally to driver risk assessment systems and, more specifically, to a System and Method for Driver Risk Assessment through Continuous Performance Monitoring.

2. Description of Related Art

Monitoring vehicle driver performance has exploded in recent years. Employers and municipalities operating fleets of vehicles are particularly interested in monitoring driver performance because risky driving behaviours inevitably result in increased cost due to loss claims as well as unacceptable downtime (for vehicles and drivers). Some systems even record video for the purpose of providing evidence, such as for accident reconstruction.

Insurance companies have become very active in the field of driver performance monitoring for many of the same reasons and fleet vehicle employers. Insurance companies seek this information for another reason—so that the insurance company can actually adjust the driver's insurance premium based upon how risky that particular driver behaves when driving.

The vast majority of driver monitoring systems are "triggered event" systems. These systems monitor a variety of sensors within the vehicle while the driver is driving. These sensors could be monitoring speed, acceleration (in 3 dimensions), location (typically by GPS), sound and video. Proximity sensors are also employed by some systems, in order to monitor when the vehicle approaches too closely to objects that are external to the vehicle. While there are a plethora of sensor and analytical packages available from the prior systems, they generally all operate on the same philosopy—they identify risky driving "events" by detecting when at least one of the sensors detects a parameter that is above a pre-established threshold value. For example, if an accelerometer in the vehicle detects extreme deceleration (i.e. above a pre-set safe threshold), the system will identify an "event." FIG. 1 depicts how these prior systems generally operate.

FIG. 1 is a flowchart depicting the driver scoring method 10 of a conventional driver risk assessment system. The system is coupled to a variety of sensors—some of which may already be a part of the vehicle's built-in systems (i.e. OBD system). Each system-provider monitors their own set of parameters, including potentially audio and video. The selected sensors are monitored continuously 100, and usually have a FIFO memory buffer area within which a selected amount of historical data is maintained continuously 102. If none of the data detected by the sensors exceeds a threshold 104, the system continues its sensor monitoring activity 100

If any of the sensor data is determined by the system to have exceeded a pre-set threshold (e.g. deceleration higher than a certain amount) 106, the system typically will classify the occurrence as a "risky driving event" 108 (although a multitude of event naming conventions exist). This "trigger" can result in a variety of responses by the system—there may be a local or remote alert generated 110. The buffered data (video, audio, sensor readings, etc.) is tagged 112 and moved to a non-volatile memory area 114. At some point, the stored data is uploaded 116 to a central server system—this is usually via wireless (cellular) network, although wifi, RF and even wired transfer of data has also been provided.

The driver's score 118, or other "rating" or "grade" for the driver's performance during the event is created after evaluation of the sensor data leading up to and continuing through the triggered "event." This evaluation has been provided by automated analysis, as well as including human oversight and evaluation.

The problem with these prior "trigger-based" reporting systems is that they are inherently faulty in the theory of their operation. They are evidence-centric in their design, and therefore are more concerned with capturing as much data as possible, rather than focusing on the data that is really predictive of the performance of the driver. Capturing and uploading video and audio data can be extremely costly. Also, the review of this data by humans is also time-consuming and therefore costly. Consequently, these prior systems must be ever-careful on the circumstances upon which data is uploaded and reviewed, and so quite a bit of effort is expended on adjusting the sensor trigger thresholds so that false positives are minimized. Furthermore, these large amounts of data are not always valuable at actually grading the drivers performance for each and every minute that the driver is driving.

What is needed, then, is a driver performance monitoring and grading system that provides continuous review and grading of the entirety of all trips that the driver drives. The focus should be on performance monitoring, rather than on building evidence.

SUMMARY OF THE INVENTION

In light of the aforementioned problems associated with the prior systems and methods, it is an object of the present invention to provide a System and Method for Driver Risk Assessment through Continuous Performance Monitoring. The system and method should be designed to analyze the full sensor data stream emanating from a vehicle when being driven. The system and method should be configurable to rely upon either onboard sensors or the user's smartphone to alert the data capture systems that a driving trip has started or stopped. The system should rely on the data contained within the stream to generate the driver's score, rather than upon events resulting from the sensors exceeding a threshold value. The method should take the flow of data and generate scores for sub-sets of the data stream of a standard length so that each user's driving performance can be compared to other drivers being monitored by the method and system.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIG. 5 is a table identifying an exemplary normalized driver risk report based on the operation of the system of FIG. 2.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a System and Method for Driver Risk Assessment through Continuous Performance Monitoring.

Figure 2:
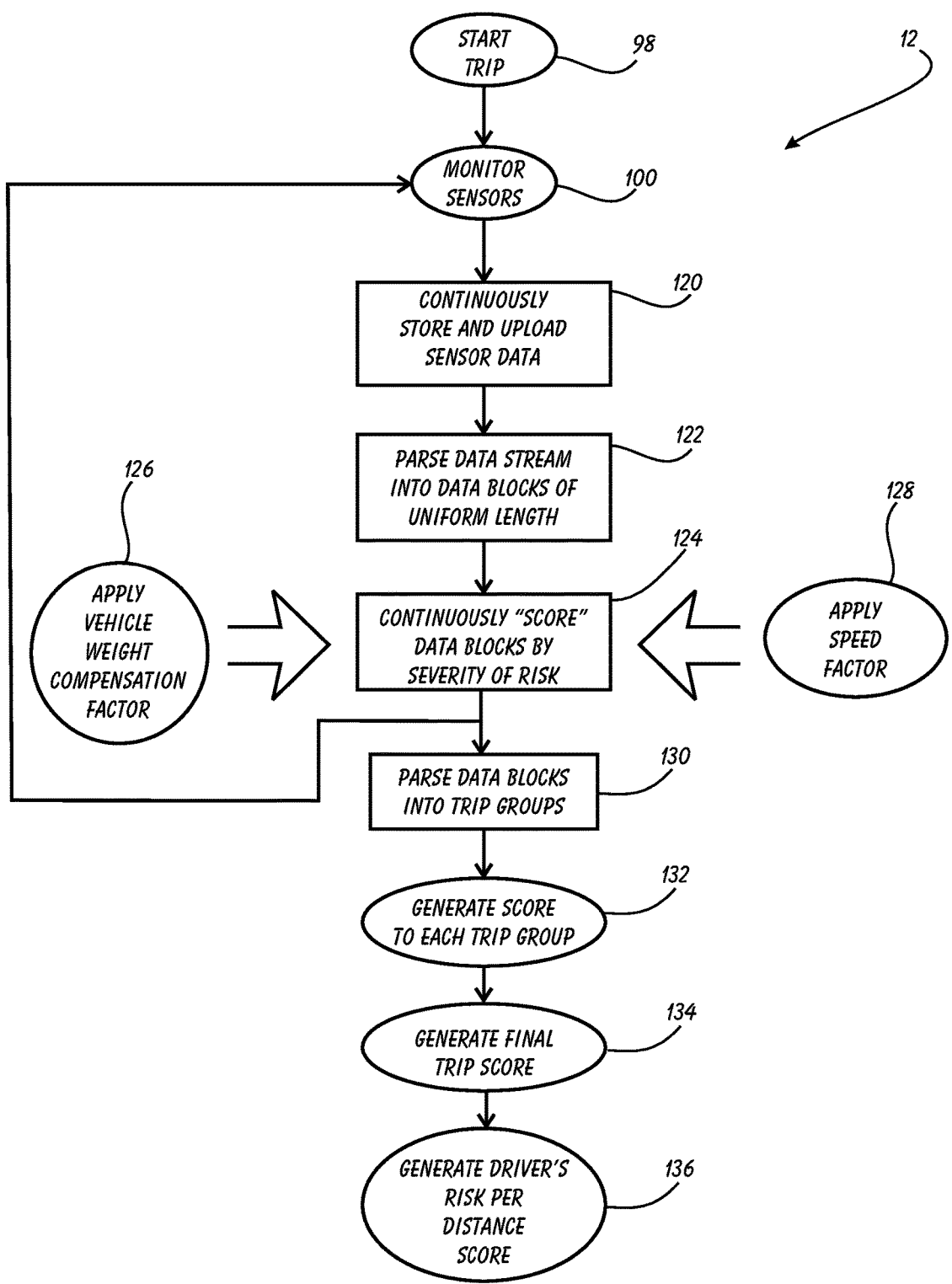
FIG. 2 is a flowchart depicting a preferred embodiment of the driver scoring method of the present invention.

The present invention can best be understood by initial consideration of FIG. 2.[1] FIG. 2 is a flowchart depicting a preferred embodiment of the driver scoring method 12 of the present invention. A critical distinction between the prior art "crash recorders" and the system of the present invention is that the instant system relies upon a sophisticated understanding and analysis of a vehicle's condition while it is being driven, and how certain detected conditions can combine to predict the level of risk created by a particular driver. This prediction of risk does not rely upon any sensor threshold setting being exceeded, but rather upon a host of real-world factors that, now that they are understood, show what sort of driver is operating the vehicle. Does the driver's performance indicate that he or she does not pay as much attention to the driving task as he or she should? Does the driver's general technique indicate that the driver is excessively aggressive? Are the observations of a driver's inattentiveness, impatience or aggressiveness a regular occurrence, or are they few and far between? These factors will also be affected by traffic congestion, road size and quality, weather conditions, and other environmental aspects of a driver's trip or trips, as these factors can have a large effect on how vehicle sensor data should be interpreted.

[1] As used throughout this disclosure, element numbers enclosed in square brackets [ ] indicates that the referenced element is not shown in the instant drawing figure, but rather is displayed elsewhere in another drawing figure.

Figure 1:
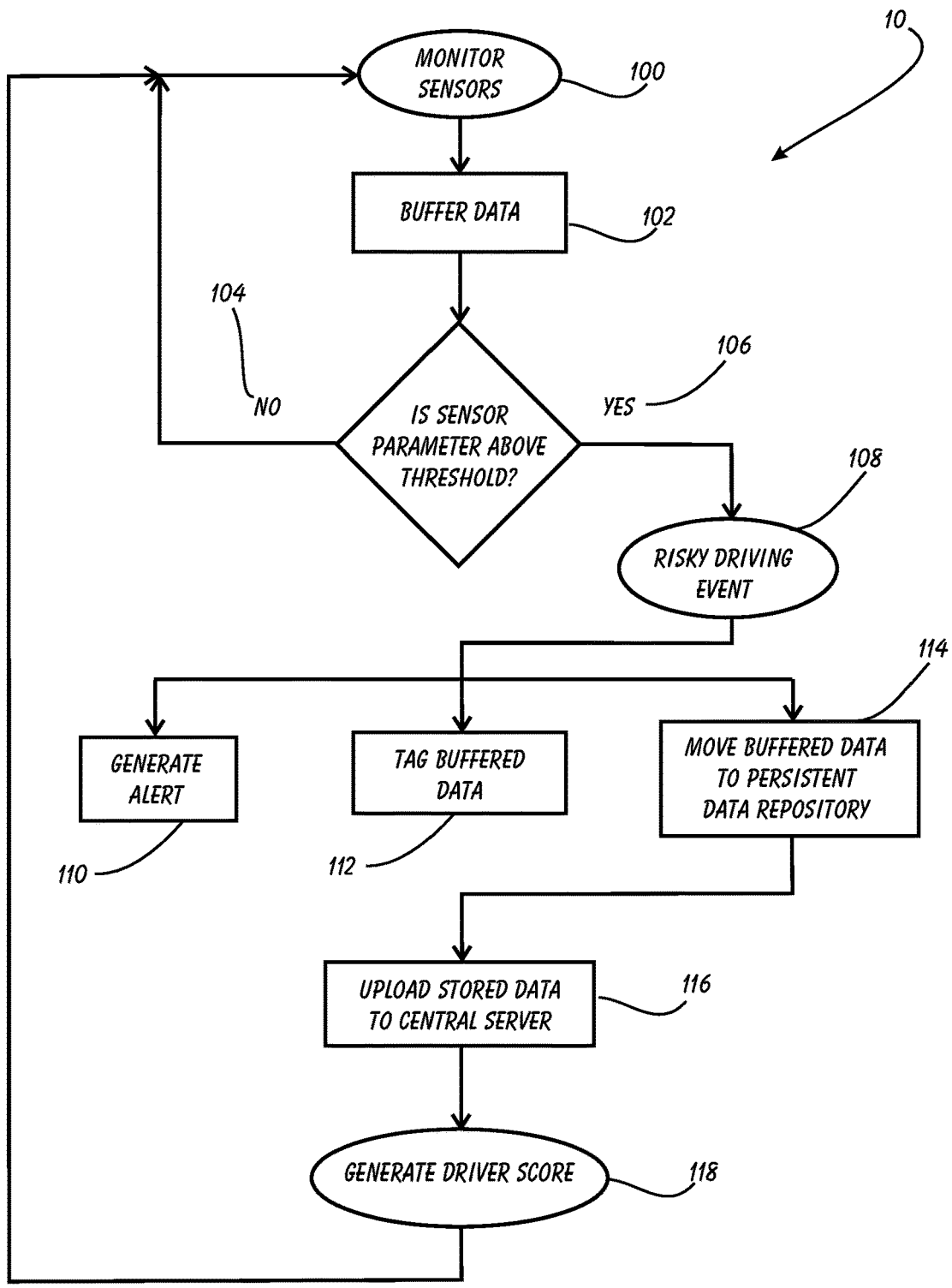
FIG. 1 is a flowchart depicting the driver scoring method of a conventional driver risk assessment system.

In the method 12 for driver risk assessment via continuous trip monitoring of the present invention, like that of the prior art method of FIG. 1, starts with the monitoring of sensor data 100. Unlike the prior system [10], the method 12 tends to avoid the need for large quantities of data, such as video or audio data. The data used in this method 12 tends to be that available from the vehicle's Onboard Data Bus, as well as accelerometer, GPS and potentially other data that requires small amounts of storage capacity and small wireless transmission bandwidth—this means that the vehicle can be monitored and data recorded and analyzed at all times. Common data that may be utilized to score the driver's performance includes vehicle acceleration (and deceleration), vehicle speed, vehicle weight and/or weight changes, and vehicle location, among other factors.

Of course, the system must be notified whenever a driver's trip starts 98. This could be generated by the monitoring system installed within the vehicle, or it could even be via a portable computing device, such as a cellular "smartphone." For example, the smartphone could have a specialized application that communicates with the system's central server to notify the server that the driver (associated with the smartphone) has commenced a driving trip (and also has ended a driving trip). The driver could manually activate the start/stop, or the smartphone's application could detect the start/stop condition automatically. Of course, as the driver drives, the central server computer could feed the driver's continuous trip score results.

The data from the sensors, once a trip has commenced 98, is continuously stored and uploaded 120. The upload of the data can be conducted immediately (continuously), or it could be stored locally and uploaded when most appropriate (in order to reduce transmission cost and/or when wireless connectivity is in a good condition). Whether uploaded in real time or at a later time, the entire data stream is captured and transmitted.

This stream of continuous sensor data is then broken up or parsed into data blocks of uniform length 122. The purpose of step 122 is to be able to characterize the driving behavior for each block as a unit. This practice creates a standard unit of measure for the scoring of all portions of all drivers' driving trips. Each of these data blocks are then scored by the severity of risk that the driver's behavior created 124. It has been determined that a one-second duration of sensor data is a suitable and manageable data block. This is a radical departure from the prior system [10], where driver performance is based upon the quantity of "triggers" or "triggered events" that occur per mile driven by the driver. Under this method 12, the driver's performance is being scored even when no behaviors or events would have resulted in the triggered event in the prior system [10].

The scoring of all data blocks is influenced by the vehicle's weight characteristics (e.g. load status, center of gravity, etc.) and the speed of the vehicle (e.g. most acceleration/deceleration becomes indicative of more risky driving the higher the speed that the vehicle is travelling during the acceleration/deceleration). Scoring of the data blocks is responsive to the inclusion of compensation factors for vehicle weight 126 and speed 128.

Once scored, the data blocks are parsed into trip groups 130. Grouping the scored data into a "trip" of a standard length makes the comparison between drivers (and to the driver's own historical performance) possible. It has been found that a 10-minute duration is suitable for these trip groups.

The system then generates a score for each trip group 132 that relies upon the individual scores of the data blocks that make up each trip group. Once each trip group has its individual score, a final trip score is generated for all of the trip groups that make up a single particular trip 134. By taking this systematic approach, the system of the present invention reports on a driver's performance for each completed trip, as well as breaking down all trips into standard units of measure so that the driver's is readily comparable to other "normalized" scores.

Figure 4:
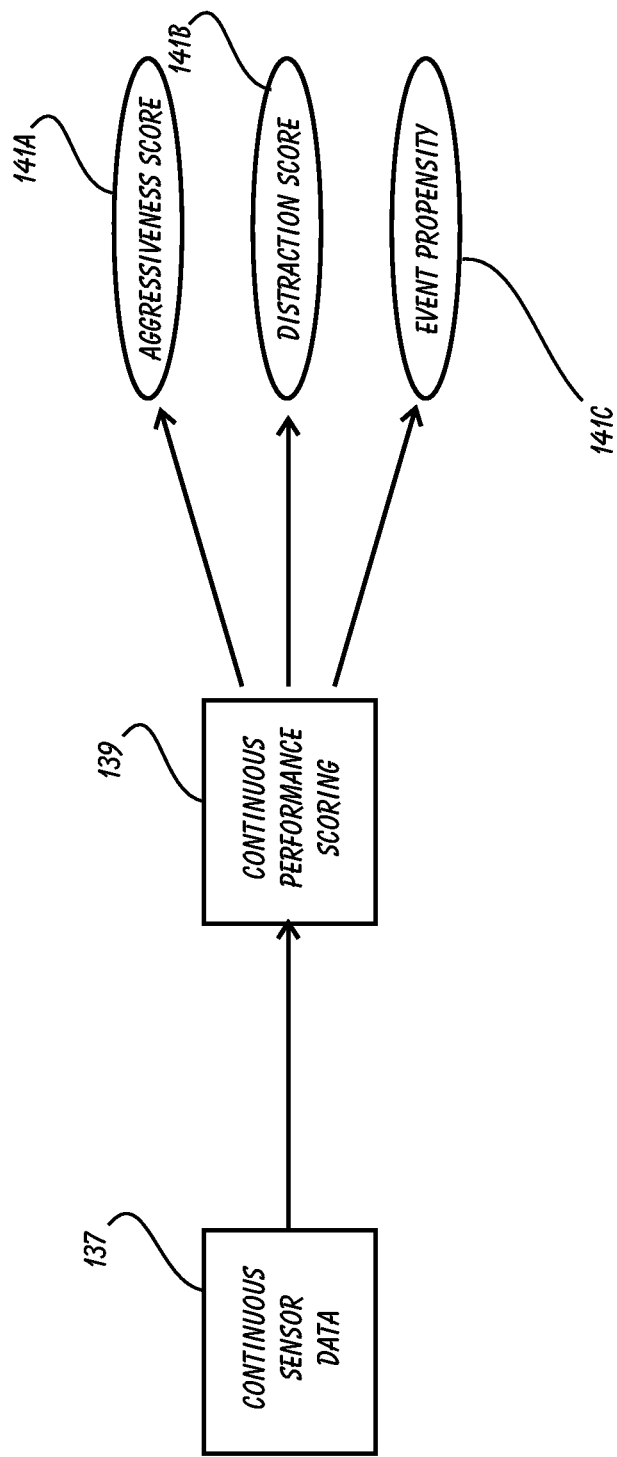
FIG. 4 is a diagram depicting a simplified version of the data and analysis flow of the system and method of the present invention.

Finally, if desired, a risk per distance score 136 can be computed for the driver—in a standard form, such as a rating from 0 to 10. As shown in FIG. 4, continuous sensor data 137 is scored continuously 139, in order to generate continuous scores for aggressiveness 141A and distraction 141B, as well as for the propensity of this driver to experience "events" that indicate unacceptable levels of risk 141C.

Figure 3:
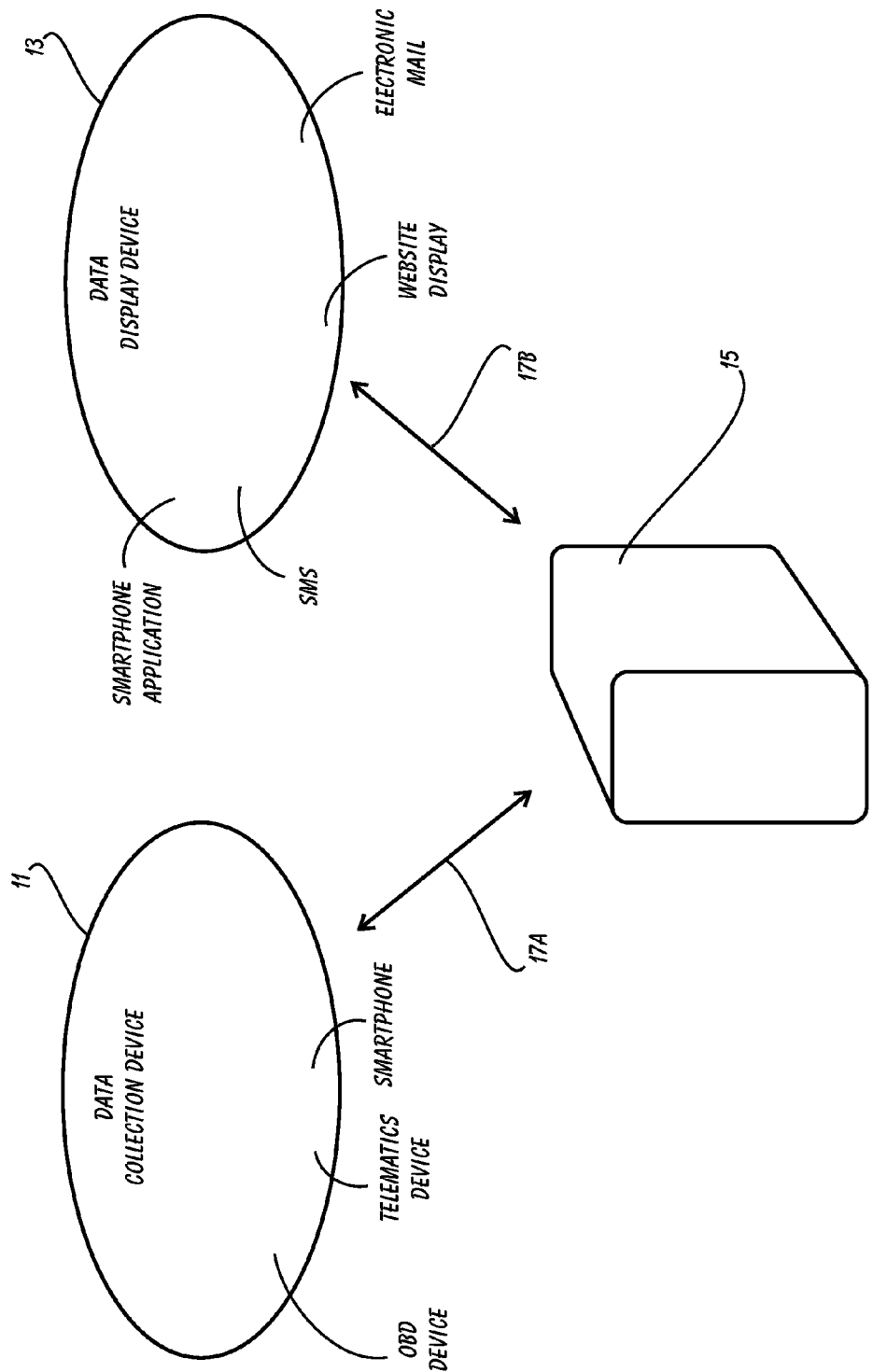
FIG. 3 is depicts the functional elements of a preferred system for implementing the method of FIG. 2.

FIG. 3 is depicts the functional elements of a preferred system for implementing the method of FIG. 2; Data analysis and reporting and overall system control is managed through the central server computer 15. The server 15 receives its data from Data Collection Device 11 via first communications pathway 17A. This pathway 17A could comprise a variety of conventional forms, including cellular network, WiFi, Bluetooth, and even hardwire or data storage device transfer. The data collection could be handled by a variety of sources including a device connected to the ODB, a telematics device and even the user's smartphone (for example an Application that controls trip start/stop as discussed herein).

User display of results is a data display device 13 in communications with the central server computer 15 via second communications pathway 17B. Members of the data display device group 13 include a Smartphone (via an Application), SMS/instant messaging, display via a website/portal, or via electronic mail.

FIG. 5 is a table identifying an exemplary normalized driver risk report 14 based on the operation of the system of FIG. 2. In this version, acceleration, braking, turning and speed have each received individual scores for all of trips that the driver undertook during a selected reporting period. For example, S(VA2) is a number indicating how many times the driver accelerated at severity (2) per mile of all trips driven during the reporting period. S(VA1) is the score indicating how many times the driver accelerated at severity (1) per mile during the reporting period. For example, severity (1) could be 1, while severity (2) could be 1.5. These severity thresholds are normalized values that represent hierarchical levels of risk of the individual component scores (acceleration, braking, turning). These accelerations may apply similarly to the deceleration of the vehicle during braking [S(VB1) and S(VB2)], as well as turning [S(VT1) and S(VT2)]. Speeds are simply exceeding certain predetermined thresholds—however, speed at the time of a driving maneuver may be a factor in raising (or lowering) a score for acceleration, braking or turning (i.e. high-speed maneuvering is more risky than low-speed maneuvering, even if acceleration is the same).

Since there is more at work in evaluating risk than just how hard or how many times a driver accelerates, additional factors must be applied. Individual weighting factors are applied to the severity scores so that the scores will then reflect actual risk. These weighting factors have been classified as factors attributable to driver aggressiveness and factors attributable to driver distraction. The weight applied to different severities individually. Each weight or weighting factor is standardized for all drivers and all vehicles.

Figure 6:
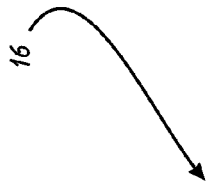
FIG. 6 is a table identifying an exemplary driver trip score report based on the operation of the system of FIG. 2.

FIG. 6 depicts a table identifying an exemplary driver trip score report 16 based on the operation of the system of FIG. 2. As shown, the system will report on a driver's general tendencies regarding acceleration, braking and turning, as it is acknowledged that driver performance during these three activities reveals how risky the driver is tends to drive. The normalized scores (e.g. 0-10) for acceleration, braking and turning are all weighted in order to arrive at a driver total score for a particular reporting period. This total driver score or driver profile score has been determined to accurately reflect the tendencies that the driver exhibits while driving, and their overall contribution to that driver's driving riskiness.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for assessing the risk of a vehicle driver's driving, comprising the steps of:
   detecting a trip commencement;
   continuously recording sensor data representing the physical behavior of the vehicle that the driver is driving;
   parsing said continuously recorded sensor data into data blocks of predetermined length of recorded time;
   analyzing the sensor data of each said parsed data block and responsively assigning a data block risk score thereto;
   grouping said parsed data blocks into trip groups of predetermined length of time;
   analyzing the cumulative sensor data of each said trip group and responsively assigning a trip group risk score thereto;
   detecting a trip cessation;
   analyzing the trip group risk scores for the period between said trip commencement and said trip cessation and responsively assigning a trip risk score thereto.

2. The method of claim 1, wherein said data block risk score assignment step further comprises adjusting said data block risk score responsive to the speed of the vehicle during the time period defining said data block length of recorded time.

3. The method of claim 2, wherein said data block risk score assignment step further comprises adjusting said data block risk score responsive to the weight of the vehicle during the time period defining said data block length of recorded time.

4. The method of claim 3, wherein data block risk score comprises component scores for the driver's driving the vehicle, said component scores comprising the vehicle's acceleration behavior during the time period defining said data block length of recorded time.

5. The method of claim 4, wherein said data block risk score further comprises the vehicle's braking behavior during the time period defining said data block length of recorded time.

6. The method of claim 5, wherein said data block risk score further comprises the vehicle's turning behavior during the time period defining said data block length of recorded time.

7. The method of claim 6, wherein said data block risk score further comprises the vehicle's speed behavior during the time period defining said data block length of recorded time.

8. The method of claim 1 further comprising analyzing said trip risk score and the distance travelled by the vehicle between said detected trip commencement and said detected trip cessation and responsively generating a risk per distance score for the driver.

9. A driver risk assessment system, comprising:
   a trip sensor for determining the commencement and cessation of a driving trip for a driver in a vehicle;
   at least one data collection device associated with said vehicle, said data collection device configured to collect vehicle speed, acceleration and turn data;
   a central server computing device receiving continuously from one or more said data collection devices, said central server computing device comprising a processor and a data storage system, said central server computing device configured to:

continuously record sensor data from said one or more data collection devices responsive to said trip sensor;

parse said continuously recorded sensor data into data blocks of predetermined length of recorded time;

analyze the sensor data of each said parsed data block and responsively assigning a data block risk score thereto;

group said parsed data blocks into trip groups of predetermined length of time;

analyze the cumulative sensor data of each said trip group and responsively assigning a trip group risk score thereto;

analyze the trip group risk scores for the period between a trip commencement and a trip cessation and responsively assigning a trip risk score thereto; and a transmitter for transmitting said data block risk scores, said trip group risk scores and said trip risk scores;

a first communications conduit between said one or more data collection devices and said central server computing device; and a data display device in communication with said central server computing device via a second communications communications conduit, whereby said data display device receives said data block risk scores, said trip group risk scores and said trip risk scores via transmitted by said central serving computing device.

10. The driver risk assessment system of claim 9, wherein said trip sensor comprises a personal computing device selected from a group including cellular telephones, tablet computing devices and laptop computing devices.

11. The driver risk assessment system of claim 10, wherein said trip sensor is configured to automatically detect the commencement and cessation of a trip responsive to motion of the vehicle, while said trip sensor is residing in the vehicle.

12. A method of evaluating the performance of a driver driving a vehicle, the method being implemented in a programmed computer system comprising a processor, a data storage system, a data receiver and a data transmitter, the method comprising the steps of:

receiving a trip commencement signal indicating that a driver and vehicle have commenced a driving trip;

continuously receiving sensor data representing the physical behavior of the vehicle that the driver is driving;

parsing said continuously received sensor data into data blocks of predetermined length of recorded time;

analyzing the sensor data of each said parsed data block and responsively assigning a data block risk score thereto;

grouping said parsed data blocks into trip groups of predetermined length of time;

analyzing the cumulative sensor data of each said trip group and responsively assigning a trip group risk score thereto;

receiving a trip cessation signal indicating that said driver and vehicle have concluded said driving trip; and analyzing the trip group risk scores for the period between said trip commencement and said trip cessation and responsively assigning a trip risk score thereto.

13. The method of claim 12, wherein said data block risk score assignment step further comprises adjusting said data block risk score responsive to the speed of the vehicle during the time period defining said data block length of recorded time.

14. The method of claim 12, wherein said data block risk score assignment step further comprises adjusting said data block risk score responsive to the weight of the vehicle during the time period defining said data block length of recorded time.

15. The method of claim 12, wherein data block risk score comprises component scores for the driver's driving the vehicle, said component scores comprising the vehicle's acceleration behavior during the time period defining said data block length of recorded time.

16. The method of claim 12, wherein said data block risk score further comprises the vehicle's braking behavior during the time period defining said data block length of recorded time.

17. The method of claim 12, wherein said data block risk score further comprises the vehicle's turning behavior during the time period defining said data block length of recorded time.

18. The method of claim 12 further comprising analyzing said trip risk score and the distance travelled by the vehicle between said trip commencement signal and said trip cessation signal and responsively generating a risk per distance score for the driver.

19. The method of claim 12, wherein said trip commencement signal and said trip cessation signal are generated by a handheld computing device.

20. The method of claim 19, wherein said trip commencement signal and said trip cessation signal are generated by said handheld computing device responsive to said handheld computing device detecting that it is in the vehicle and that the vehicle has exhibited movement representative of a trip commencement or cessation.

* * * * *